United States Patent
Luo et al.

(10) Patent No.: US 11,085,617 B2
(45) Date of Patent: Aug. 10, 2021

(54) FOLDABLE LED LAMP WITH DETACHABLE BALLAST AND USE METHOD THEREOF

(71) Applicant: Sinowell (Shanghai) Co., Ltd., Shanghai (CN)

(72) Inventors: Jia Luo, Shanghai (CN); Yan Yang, Shanghai (CN)

(73) Assignee: Sinowell (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/896,282

(22) Filed: Jun. 9, 2020

(65) Prior Publication Data

US 2020/0300447 A1 Sep. 24, 2020

(51) Int. Cl.
| | | |
|---|---|---|
| F21V 21/30 | (2006.01) |
| F21S 8/06 | (2006.01) |
| F21V 23/02 | (2006.01) |
| F21Y 115/10 | (2016.01) |

(52) U.S. Cl.
CPC .............. F21V 21/30 (2013.01); F21S 8/061 (2013.01); F21V 23/026 (2013.01); *F21Y 2115/10* (2016.08)

(58) Field of Classification Search
CPC ......... F21S 8/061; F21V 21/30; F21V 23/026
See application file for complete search history.

(56) References Cited

U.S. PATENT DOCUMENTS

| | | | |
|---|---|---|---|
| 6,450,668 B1* | 9/2002 | Kotloff | F21S 8/06 362/221 |
| 2008/0007943 A1* | 1/2008 | Verfuerth | F21V 29/83 362/157 |
| 2011/0279063 A1* | 11/2011 | Wang | F21V 23/006 315/313 |
| 2013/0141904 A1* | 6/2013 | Verfuerth | F21K 9/27 362/221 |
| 2017/0023193 A1* | 1/2017 | Thosteson | F21S 8/061 |
| 2019/0064426 A1* | 2/2019 | Ju | F21V 23/06 |

* cited by examiner

*Primary Examiner* — William N Harris
(74) *Attorney, Agent, or Firm* — CBM Patent Consulting, LLC

(57) ABSTRACT

A foldable lamp holder comprises two side supports, and each of the side supports comprises a first support and a second support, which are symmetrically arranged with each other; ends of the first support and the second support on the same side are hinged; the first support and the second support are respectively provided with a plurality of lamp bar interfaces. The lamp can extended along with the side supports, an LED lamp tube moves outwards simultaneously along with the side supports, thereby extending the irradiation range of the lamp. The ballast can be hung in various ways. The ballast can be connected to the foldable lamp holder as an integrated lamp through the extension on a ballast shell. In addition, the lamp can be hung in various ways.

10 Claims, 7 Drawing Sheets

FOLDABLE LED LAMP WITH DETACHABLE BALLAST AND USE METHOD THEREOF

This application claims priority to Chinese Patent Application Ser. No. CN201922134283X filed on 3 Dec. 2019.

TECHNICAL FIELD

The present invention relates to the technical field of LED lamps for indoor planting, and more particularly, to a foldable LED lamp with a detachable ballast, and a use method thereof.

BACKGROUND OF THE INVENTION

In the field of indoor planting there are multiple methods to provide light sources, including hanging lights and ballasts, table lamps, LED lamps, or lamp and ballast combinations that cover a specific area directly beneath the light source. The contemporary construction of lamp assemblies omit light above and to the sides of the light and reflector, reducing the range of potential placements of plants, including in designs such as vertical farming or hydroponic agriculture. Additionally, foldable lamps generally refers to lamp covers rather than positions of lamp tubes, further reducing light irradiation range and expansion.

U.S. Pat. No. 9,810,400B2 discloses an adjustable reflector device for light fixtures that is able to adjust the irradiation intensity of a lamp by rotating and folding the lamp cover, but the structure itself cannot be reduced by folding (for transportation, etc.). U.S. Pat. No. 9,810,400B2 discloses a collapsible LED fixture that can be compactly stored for transport but the expansion range of its LED lamp bars cannot be adjusted.

SUMMARY OF THE INVENTION

The technical objective of the present invention is to overcome the defects of prior designs and to provide a foldable LED lamp with a detachable ballast, and a use method thereof, which can realize convenient folding, adjusting, and lifting.

To fulfill said objective, a foldable LED lamp with a detachable ballast has been designed that is comprised of a foldable lamp holder; the foldable lamp holder is comprised of two side supports, and each of the side supports is comprised of a first support and a second support which are symmetrically arranged with each other; the ends of the first support and the second support on the same side are hinged; the first support and the second support are respectively provided with a plurality of lamp bar interfaces; a plurality of LED lamp bars arranged in parallel are connected between the first supports of the two side supports and between the second supports of the two side supports through the LED lamp bar interfaces; connectors are correspondingly provided on the upper sides of the first support and the second support, respectively; the outer end of each connector is provided with a through hole through which the foldable lamp holder is hung by a steel cable.

The present invention further has the following preferred technical solutions:

Each LED lamp bar is sleeved with a hook through which the foldable lamp holder can be hung by a steel cable;

Each hook is comprised of a first straight section and a second straight section extending from both sides of the corresponding LED lamp bar to the upper side of the middle of the LED lamp bar, wherein the first straight section and the second straight section are in parallel with each other, and are connected by a third straight section provided in a set direction of the LED lamp bar.

Extension buckles are symmetrically arranged on the left and right sides of the ballast, and are respectively connected to two different LED lamp bars, so that the ballast can be hung over the LED lamp bars.

Each extension buckle is comprised of a first extension section extending downward from the ballast, a second extension section extending horizontally away from a ballast from the tail end of the extension section, and a third extension section located at the tail end of the second extension section, wherein the third extension section comprises a first arc-shaped section extending away from the ballast and a second arc-shaped section located at the tail end of the first arc-shaped section and extending close to the ballast, which are connected with the LED lamp bars.

The curvature radius of the first arc-shaped section is greater than the curvature radius of the second arc-shaped section.

The height of the bottom end of the first extension section is higher than the height of the bottom end of the ballast.

The surface of the ballast is designed with a cross nail hole for hanging.

The plurality of LED lamp bar interfaces is respectively organized in parallel lengthwise from the first support and the second support.

The present invention further relates to a use method of a foldable LED lamp with a detachable ballast, wherein the foldable LED lamp is suitable for indoor planting and comprises three usage modes:

a. The ballast is hung over the LED lamp bars via extension buckles, and the foldable lamp holder and the LED lamp bars are hung via connectors;

b. The ballast is separated from the LED lamp bars and fixed separately to the side of a plant shelf, and the foldable lamp holder and the LED lamp bars are hung at a position that fits on the plant shelf through hooks sleeving the LED lamp bars; and c. The ballast is separated from the LED lamp bars and is fixed separately, and the foldable lamp holder and the LED lamp bars are hung via the hooks sleeving the LED lamp bars or via the connectors.

Compared with the prior art, the present invention of a simple construction, is easy to install and detach, and is particularly suitable for indoor planting scenarios. The present utility model has the following advantages:

The lamp itself can be folded to reduce the size of the overall package and prevent damage during transportation and carrying;

The lamp can be extended along with the side supports, while the LED lamp tube moves outwards simultaneously along with the side supports, thereby extending the irradiation range of the lamp;

The ballast can be hung in various ways;

The ballast can be connected to the foldable lamp holder as an integrated design through the extensions on the ballast shell, such that the installation is convenient for a variety of scenarios;

The ballast can also be hung separately at different angles through the cross nail hole;

The ballast can also be separately hung through a V-shaped hook; Because of its adjustability, the lamp can be hung in a variety of positions; and The lamp can be attached to surfaces by using V-shaped wire ropes to connect the connectors located on either side of the lamp holder, or can be attached by hooks on the LED lamp bars, which can be selected according to user demands and actual conditions, increasing range of applicability.

DETAILED DESCRIPTION

The present invention will be further described with reference to the drawings. The structure and principle of this device and method are very clear to those skilled in the art of technical drawings and specifics of lighting. It should be understood that the specific embodiments described herein are only used to explain the present invention and are not used to limit the present invention.

Figure 1:
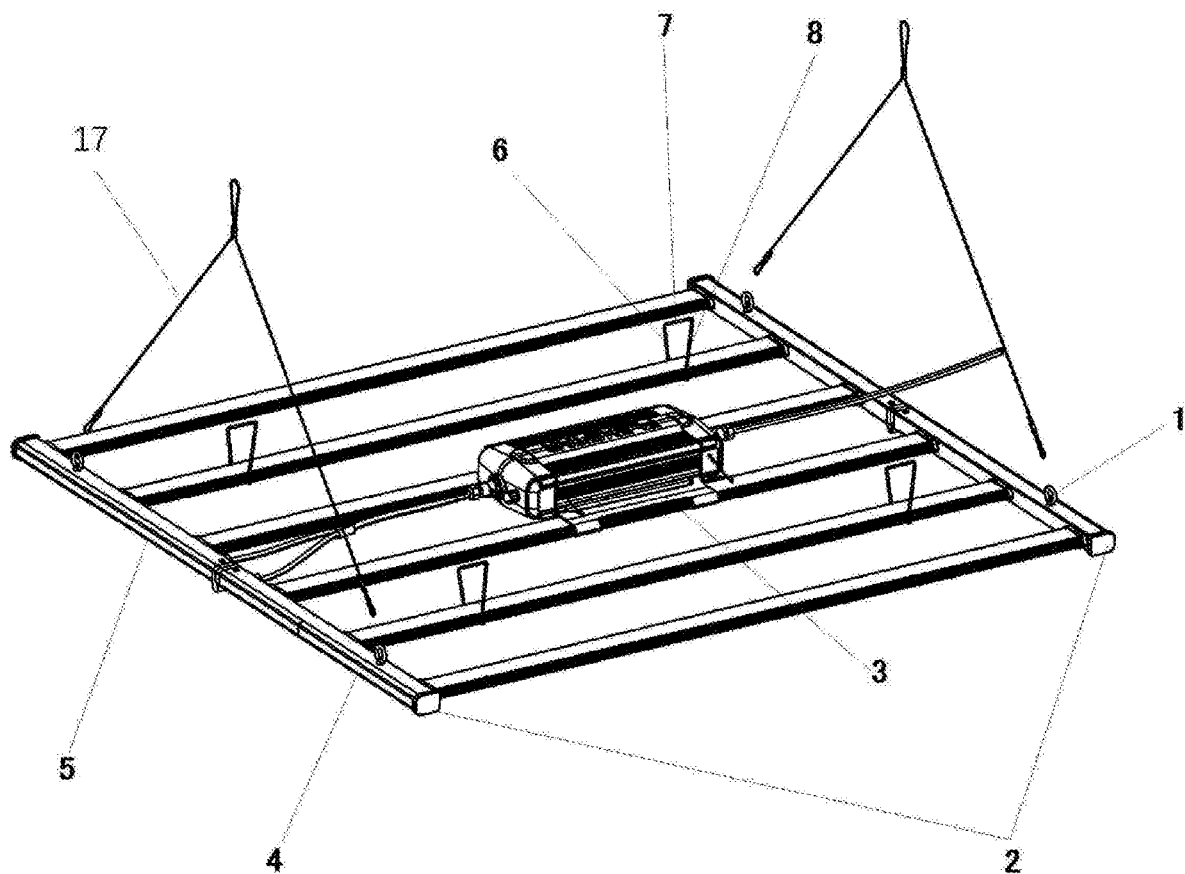
FIG. 1 is a schematic structural diagram of the present invention.
Figure 2:
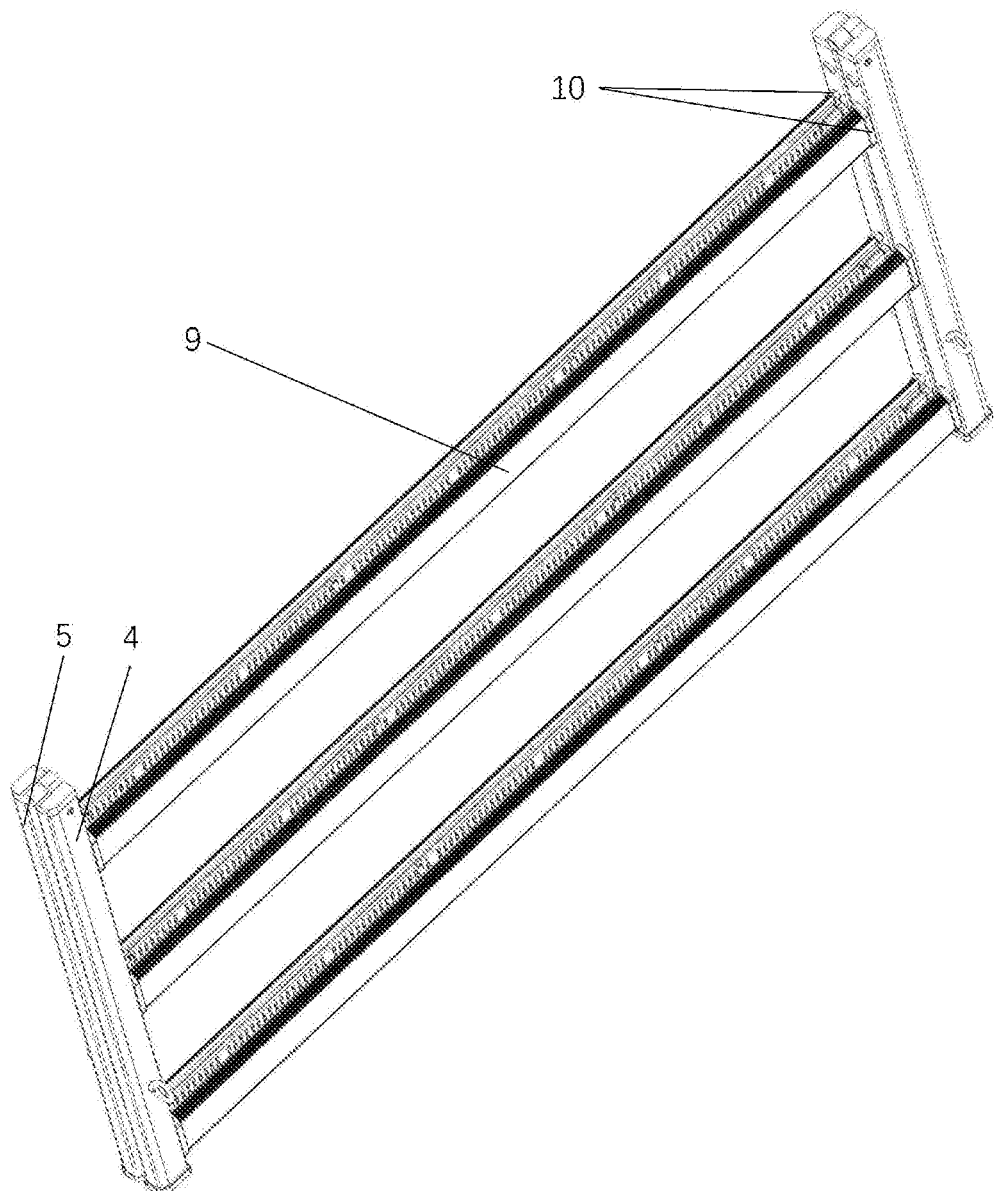
FIG. 2 is a schematic structural diagram of a foldable holder.
Figure 3:
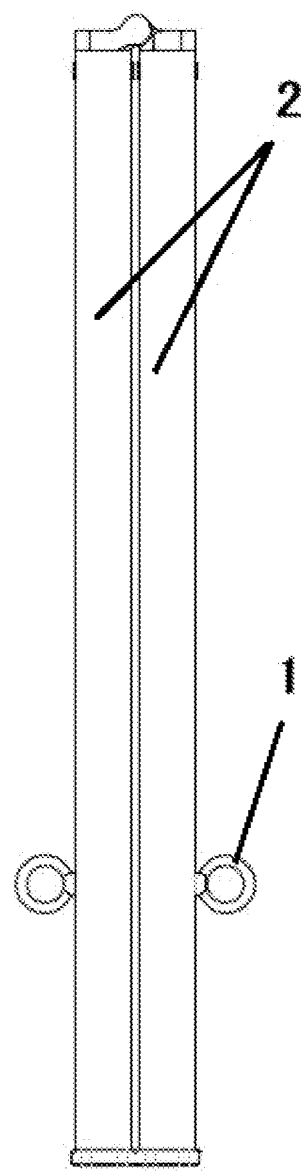
FIG. 3 is a side view when the folded holder is folded.

Referring to FIG. 1, an embodiment provides a foldable LED lamp with a detachable ballast. The foldable LED lamp comprises a foldable lamp holder which is hollowed inside for wiring. In conjunction with FIG. 2 and FIG. 3, the foldable lamp holder comprises two side supports, and each of the side supports comprises a first support and a second support which are symmetrically arranged with each other. In this embodiment, the first support and the second support have the same length, and the ends of the upper sides of the first support and the second support are mutually hinged through a structure such as a damping rotating shaft or a damping buckle or a hinge structure. In addition, the first support and the second support are respectively provided with a plurality of LED lamp bar interfaces. In this embodiment, the plurality of LED lamp bar interfaces is respectively arranged in parallel horizontally of the first support and the second support. In addition, when unfolded, the LED lamp bar interfaces on the first support and the second support of the same side support are located on the same straight line; and when folded, a straight line where the LED lamp bar interfaces on the first support of the side support are connected and a straight line where the LED lamp bar interfaces on the second support of this side support are connected are parallel to each other, thereby realizing the plurality of LED lamp bars provided in parallel. In addition, when folding is preferred, the LED lamp bar interfaces on the first support and the LED lamp bar interfaces on the second support can correspond to each other. A plurality of LED lamp bars arranged in parallel are connected between the first supports of the two side supports and between the second supports of the two side supports through the LED lamp bar interfaces. One end of each LED lamp bar is connected to an LED interface in the first support or the second support of the side support on one side, and the other end of the LED lamp bar is connected to an LED interface in the first support or the second support of the side support on the other side. Therefore, the positions of the LED lamp bars can be changed by folding the first supports and the second supports, the folding and unfolding of the LED lamp bars can be realized, and the irradiation range can be extended and expanded by unfolding. In addition, since the first support and the second support are respectively provided with a plurality of LED lamp bar interfaces, therefore a user can install the LED lamp bars at corresponding positions according to their own needs, or install different LED lamp bars at different LED lamp bar interfaces, thereby achieving different irradiation ranges and atmosphere requirements according to actual needs.

Figure 4:
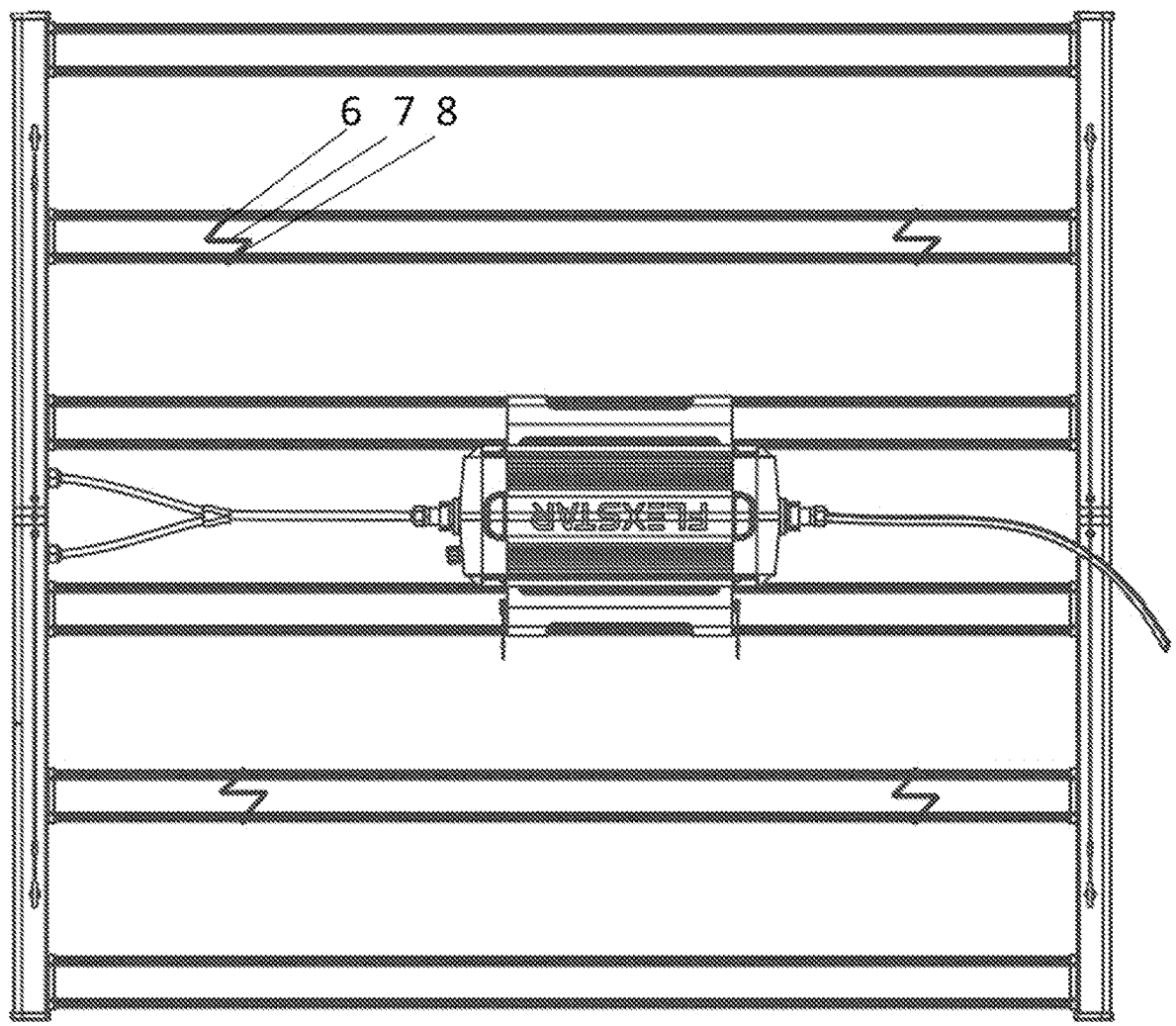
FIG. 4 is a top view of the present invention.
Figure 5:
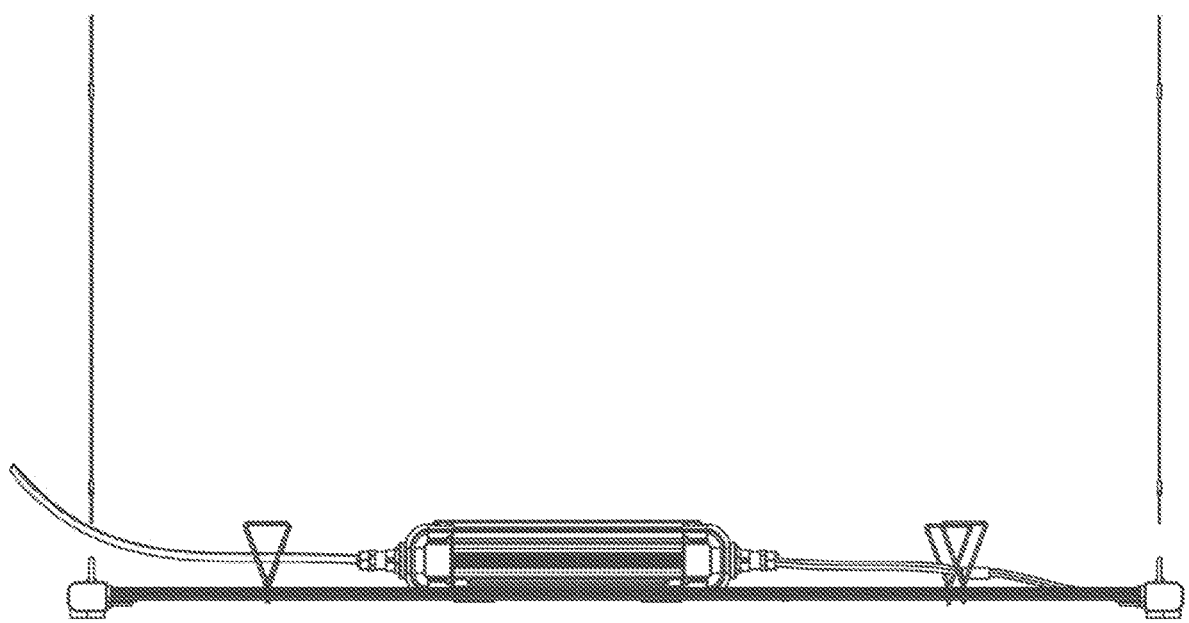
FIG. 5 is a side view of the present invention.

In addition, connectors are correspondingly provided on the upper sides of the first support and the second support, respectively. The outer end of each connector is provided with a through hole through which the foldable lamp holder is hung by a steel cable. Therefore, the foldable lamp holder can be hung and carried conveniently without disruption and is not merely limited to indoor spaces. Moreover, each LED lamp bar may be further sleeved with a hook through which the foldable lamp holder can be hung by a steel cable. In conjunction with FIG. 4, in this embodiment, each hook comprises a first straight section and a second straight section extending from both sides of the corresponding LED lamp bar to the upper side of the middle of the LED lamp bar, wherein the first straight section and the second straight section are in parallel to each other, and are connected by a third straight section provided in a setting direction of the LED lamp bar.

Figure 6:
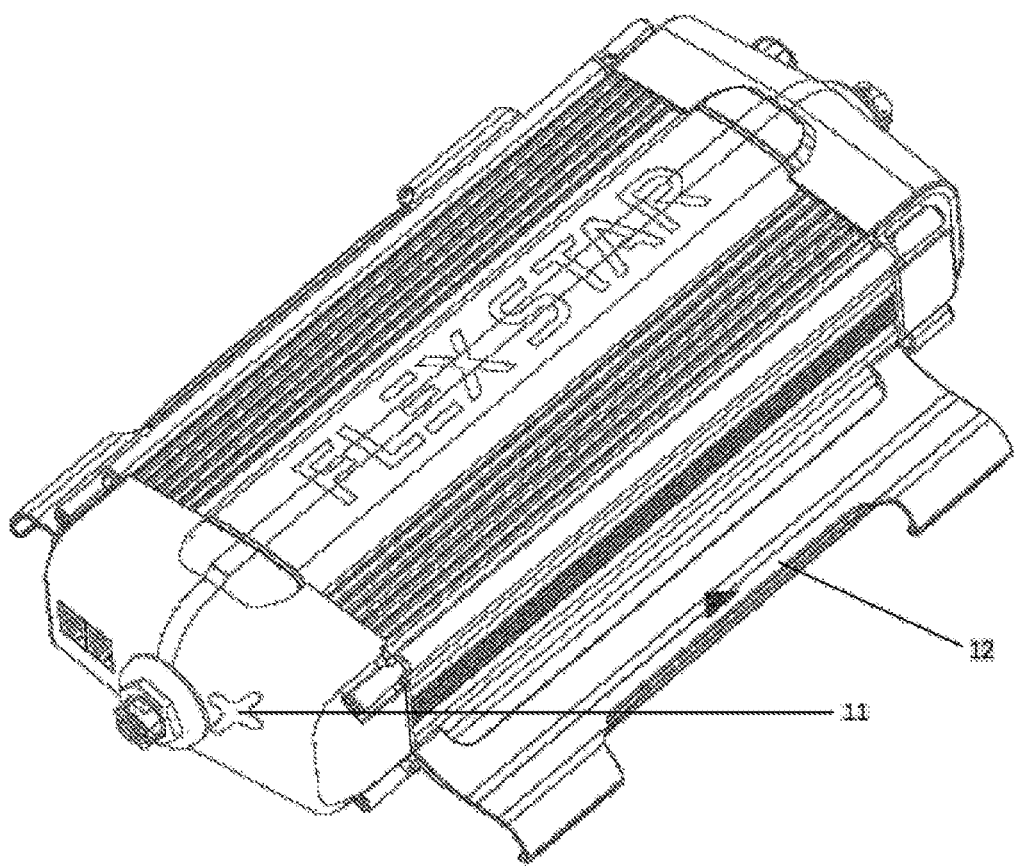
FIG. 6 is a schematic structural diagram of a ballast.
Figure 7:
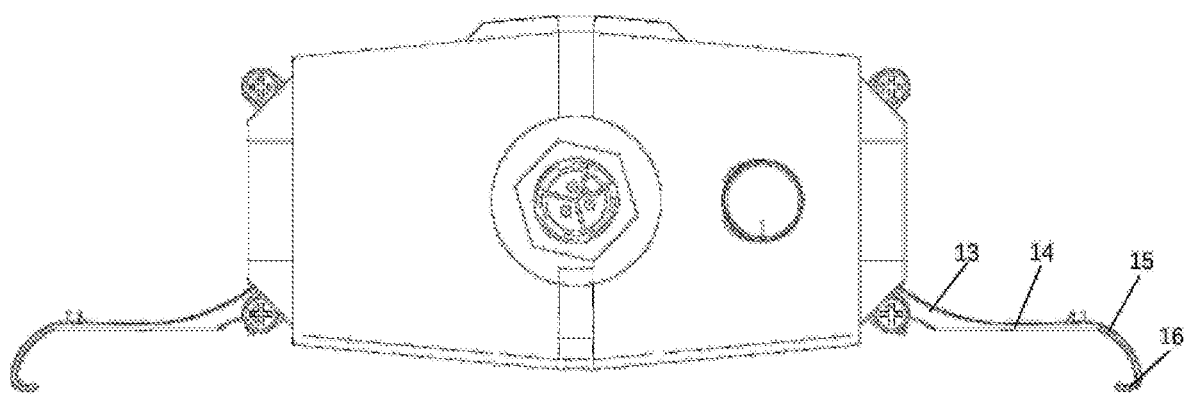
FIG. 7 is a side view of the ballast.
In drawings, the reference symbols represent the following components: 1—connector; 2—side support; 3—ballast; 4—first support; 5—second support; 6—first straight section; 7—third straight section; 8—second straight section; 9—LED lamp bar; 10—LED lamp bar interface; 11—cross nail hole; 12—extension buckle; 13—first extension section; 14—second extension section; 15—first arc—shaped section; 16—second arc—shaped section; 17—steel cable.

In conjunction with FIG. 6, extension buckles are symmetrically arranged on the left and right sides of the ballast. Preferably, the extension buckles and the ballast can be detachably connected to the left and right sides of the ballast, for example, by bolt fit, snap fit, interference fit of appropriate structures, or the like. Alternatively, the extension buckles can be fixedly connected to both sides of the ballast by welding. Alternatively, the extension buckles are integrally formed with the shell of the ballast directly. Extension buckles are respectively connected to two different LED lamp bars, so that the ballast can be hung over the LED lamp bars. In this embodiment, in conjunction with FIG. 7, each extension buckle comprises a first extension section extending downward from the ballast, a second extension section extending horizontally away from a ballast from the tail end of the extension section, and a third extension section located at the tail end of the second extension section, wherein the third extension section comprises a first arc-shaped section extending away from the ballast and a second arc-shaped section located at the tail end of the first arc-shaped section and extending close to the ballast, which are used for forming a hooked structure and are connected with the LED lamp bars. In addition, preferably, the curvature radius of the first arc-shaped section is greater than the curvature radius of the second arc-shaped section. The height of the bottom end of the first extension section is higher than the height of the bottom end of the ballast. Moreover, the ballast may not include the extension buckles, and instead include a cross nail hole for suspension is formed in the surface of the ballast. The ballast can be hung on the wall through the cross nail hole, without connecting with the lamp holder structure.

The foldable LED lamp of the detachable ballast is mainly suitable for indoor planting scenarios. For different practical indoor scenarios, growers can use this foldable LED lamp in different ways, such as installing this lamp on a double-layer plant shelf that facilitates saving space for newer agricultural techniques such as vertical farming, or installing this lamp in a grow tent.

For example, in a conventional use process, the foldable LED lamp is directly hung on from ceiling, and in this case, the ballast is hung over the LED lamp bars through the extension buckles. As another example, when this lamp is installed on a plant shelf and in order to ensure that there is sufficient space between the foldable lamp holder and the plants, the ballast and the foldable lamp holder need to be separated and installed on the side of the plant shelf; meanwhile, the foldable lamp holder is hung by the hooks sleeving the LED lamp bars to closely adhere to the plant shelf. For yet another potential scenario, when this lamp is installed in a plant tent, the foldable lamp holder and the LED lamp bars are hung by the hooks sleeving the LED lamp bars or by the connectors from the tent crossbars. In order to keep the temperature inside the plant tent as low as possible, the ballast can be removed from the foldable lamp holder and hung on the wall outside the plant tent.

It can thusly be seen that in the present invention, the ballast of the foldable LED lamp is designed to be detachable, so that the ballast has three different installation positions in the above application scenarios, and the foldable lamp holder also has two different installation positions, which greatly enrich the applications of this invention. Moreover, the packaging volume of the foldable LED lamp after being folded is significantly reduced due to the foldable design, thereby saving transportation cost. In addition, after this lamp has been folded, the LED lamp diodes face inwards, which may prevent the lamp diodes from being damaged during transportation.

What is claimed is:

1. A foldable LED lamp with a detachable ballast, comprising a foldable lamp holder, wherein the foldable lamp holder comprises two side supports, and each of the side supports comprises a first support and a second support which are symmetrically arranged with each other; ends of the first support and the second support on the same side are hinged; the first support and the second support are respectively provided with a plurality of lamp bar interfaces; a plurality of LED lamp bars arranged in parallel are connected between the first supports of the two side supports and between the second supports of the two side supports through the LED lamp bar interfaces; connectors are correspondingly provided on upper sides of the first support and the second support, respectively; and an outer end of each connector is provided with a through hole through which the foldable lamp holder is hung by a steel cable.

2. The foldable LED lamp with the detachable ballast according to claim 1, wherein each LED lamp bar is sleeved with a hook through which the foldable lamp holder can be hung by the steel cable.

3. The foldable LED lamp with the detachable ballast according to claim 2, wherein each hook comprises a first straight section and a second straight section extending from both sides of a corresponding LED lamp bar to an upper side of a middle of the LED lamp bar, wherein the first straight section and the second straight section are parallel to each other, and are connected by a third straight section provided in a setting direction of the LED lamp bar.

4. The foldable LED lamp with the detachable ballast according to claim 1, wherein extension buckles are symmetrically arranged on left and right sides of the ballast, which are respectively connected to two different LED lamp bars, so that the ballast can be hung over the LED lamp bars.

5. The foldable LED lamp with the detachable ballast according to claim 4, wherein each extension buckle comprises a first extension section extending downward from the ballast, a second extension section extending horizontally away from the ballast from a tail end of the first extension section, and a third extension section located at a tail end of the second extension section, wherein the third extension section comprises a first arc-shaped section extending away from the rectifier and a second arc-shaped section located at a tail end of the first arc-shaped section and extending close to the rectifier, which are connected with the LED lamp bars.

6. The foldable LED lamp with the detachable ballast according to claim 5, wherein a curvature radius of the first arc-shaped section is greater than a curvature radius of the second arc-shaped section.

7. The foldable LED lamp with the detachable ballast according to claim 5, wherein a height of a bottom end of the first extension section is higher than a height of a bottom end of the ballast.

8. The foldable LED lamp with the detachable ballast according to claim 1, wherein a surface of the ballast is provided with a cross nail hole for hanging.

9. The foldable LED lamp with the detachable ballast according to claim 1, wherein a plurality of LED lamp bar interfaces is respectively provided in parallel in a length direction of the first support and the second support.

10. A use method of the foldable LED lamp with the detachable ballast according to claim 5, wherein the foldable LED lamp is suitable for indoor planting and comprises three usage modes:
  a. the ballast is hung over the LED lamp bars through the extension buckles, and the foldable lamp holder and the LED lamp bars are hung by connectors;
  b. the ballast is separated from the LED lamp bars and fixed separately to a subject, and the foldable lamp holder and the LED lamp bars are hung at a position that fits on the subject through hooks sleeving the LED lamp bars; and
  c. the ballast is separated from the LED lamp bars and is fixed separately, and the foldable lamp holder and the LED lamp bars are hung by the hooks sleeving the LED lamp bars or by the connectors.

* * * * *